US008719816B2

(12) United States Patent
Troung et al.

(10) Patent No.: US 8,719,816 B2
(45) Date of Patent: May 6, 2014

(54) EXTENDABLE FRAMEWORK FOR DISTRIBUTED APPLICATIONS AND DATA

(75) Inventors: Thanh N. Troung, Salt Lake City, UT (US); Thomas Cook, Salt Lake City, UT (US); Manohar Nayak, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 1939 days.

(21) Appl. No.: 11/685,683

(22) Filed: Mar. 13, 2007

(65) Prior Publication Data
US 2007/0256073 A1    Nov. 1, 2007

Related U.S. Application Data

(60) Provisional application No. 60/782,743, filed on Mar. 14, 2006.

(51) Int. Cl.
*G06F 9/455*    (2006.01)

(52) U.S. Cl.
USPC .............................................. 718/1

(58) Field of Classification Search
None
See application file for complete search history.

(56) References Cited

U.S. PATENT DOCUMENTS

| | | | |
|---|---|---|---|
| 5,740,438 A * | 4/1998 | Ratcliff et al. | 709/250 |
| 6,003,065 A | 12/1999 | Yan et al. | |
| 6,851,112 B1 * | 2/2005 | Chapman | 718/1 |
| 6,854,114 B1 * | 2/2005 | Sexton et al. | 718/1 |
| 7,103,666 B2 * | 9/2006 | Royer et al. | 709/227 |
| 2002/0066792 A1 | 6/2002 | Guthery et al. | |
| 2003/0061497 A1 | 3/2003 | Zimmer | |
| 2004/0268363 A1 * | 12/2004 | Nace et al. | 719/312 |
| 2005/0044301 A1 | 2/2005 | Vasilevsky et al. | |

FOREIGN PATENT DOCUMENTS

| | | |
|---|---|---|
| JP | 2003-522988 | 7/2003 |
| JP | 2005-250649 | 9/2005 |

OTHER PUBLICATIONS

Dunlap, George et al., "ReVirt: Enabling intrusion analysis throught virtual-machine logging and replay", In ACM SIGOPS Operating Systems Review, vol. 36, Issue SI (Winter 2002), OSDI 2002.Proceedings of the 5th symposium on Operating systems design and implementation Special issue: Virtual machines, p. 211-224.

\* cited by examiner

*Primary Examiner* — Gregory A Kessler
(74) *Attorney, Agent, or Firm* — Thorpe North & Western LLP (57) ABSTRACT

A system and method are configured to provide a virtual application desktop and communication channel. The system includes a virtual machine executing on an operating system within which multiple applications can concurrently execute. A plurality of applications can each have a protected namespace and be configured to execute using the virtual machine. Each of the plurality of applications can have a request box. A centralized communication engine can be configured to control communications between each request box. In addition, the centralized communication engine can be configured to retrieve, transfer and distribute data between the request boxes of the plurality of applications in response to requests from the plurality of applications.

19 Claims, 6 Drawing Sheets

FIG. 1

(Prior Art)

(Prior Art)

EXTENDABLE FRAMEWORK FOR DISTRIBUTED APPLICATIONS AND DATA

CROSS-REFERENCE TO RELATED APPLICATIONS AND CLAIM OF PRIORITY

Priority of U.S. Provisional patent application Ser. No. 60/782,743 filed on Mar. 14, 2006 is claimed.

GOVERNMENT AGENCY

This invention was made with government support under grant number CHE0326027 awarded by National Science Foundation. The Government has certain rights to this invention.

BACKGROUND

With the expansion of the Internet and World-Wide-Web (or the Web), work and business environments have changed dramatically. Business has become more global and more work is moving to home offices and other locations remote from a centralized office. As a result, the need to be able to access information and resources from a remote computer system is becoming even more important.

For computing intensive work, a remote system is not just one computer or server, but rather a collection of computers either connected locally to a server or by a grid, such as the Terra Grid. The same is also true for data intensive work where data can be stored in distributed databases located on many computers at different locations.

There are currently several technologies for accessing a remote system and the Web, each has its own unique features and shortcomings. Specifically, these technologies include: 1) Web applications; 2) Remote shells; 3) Host-Guest systems.

Web applications: This technology is generally platform independent and allows users to access information and requests for services of a remote server from a web browser. Users can connect to the web portal or server via a non-secured (http) or secured (https) connection from a web page. At the server, a web application configured as a servlet is running to listen for and provide such connections. This is often known as the client-server architecture. The web application can perform tasks that are simple, such as delivering data to the requesting user, or complicated ones that involve authentication, receiving input data from the user, sending a request to the server to run a different application, or receiving output data from the server and then delivering such data back to the user.

In this software architecture, users have a relatively thin web client that communicates directly to the web application servlet and not to the server operating system (OS). Requests for resources on the server are done by the servlet. Furthermore, all computations are done on the server computer. In other words, all the web communications with the server are channeled through the servlet which provides the web data and protects the underlying server.

Remote Shell:

The remote shell technology is generally used for servers running Unix, Linux, or similar computing environments that allow a remote shell to login to the OS. Users can open an X-window on their local desktop environments to connect directly to the server using the secure shell (SSH) protocol. In this case, the user has an account, owns directories on the server, and communicates directly with the server OS using command line commands. Users do not see the desktop environment of the server using SSH.

However, users can run an application that exports a display to the local computer from the server using the X11 forwarding protocol. The X11 protocol "serves out" the screen, keyboard, mouse, etc. Unfortunately, the X11 protocol often has difficulties in exporting graphics from the server. In this technology, every event is executed on the server, which is similar to web application technology. Stability can also be a problem because a weak link in this system is also the network connection. Because the network connection is used constantly, the entire X11 session fails when the network connection fails.

Host-Guest System:

This technology has more recently been available to personal computer (PC) users and is most often a single user application. A user can install a host application on a PC computer designated as the host and a guest application on a PC designated as the guest. Such a system has generally been restricted to running on the Window OS.

Communication between the guest and host applications allows the host application to export the host desktop environment to the guest computer. The user at the guest computer can control the host computer via the exported host desktop environment including assessing data, running applications, etc. Similar to the other technologies, every event is done on the host computer. Note that the user does not communicate directly with the host OS but with the host-guest application running on the host computer. This system has the drawback that the host and guest applications are both installed before the system can be used. In addition, the host-guest system is highly dependent on communications network for the guest application to access the remote computer. When the network connection is unavailable, then the graphical images representing the guest acting on the host computer cannot be sent. Sending these graphical images or remote mirroring of the guest's actions on the host consumes a significant amount of communications bandwidth.

The discussion so far has just addressed the technologies for accessing a single remote computer, not a grid computing system. In order to access a grid computing system, a user must have an account and login into a computer where the account is grid-enabled and have resources allocated to the user on the grid. Technologies for accessing the computing grid currently do exist, such as Globus. Thus if a server is grid enabled, the server can be a gateway to the computing grid. Unfortunately, grid computing services do not generally provide remote access capability for a user who desires to accesses his/her local server that is connected to the computing grid.

For computing and data intensive processes such as scientific modeling and simulation, both individual and collaborative tasks require secure access to licensed applications and data distributed over a number of remote servers, transferring data between these servers and desktop computers, and sharing data with a team. The current paradigm for the computer work environment requires the individual to manually log on to the required servers separately in order to access the needed applications and data. Current technologies are inefficient and cumbersome to use, require a steep learning curve, are unstable due to Internet interruptions, and often require a large bandwidth for graphic applications. Collaboration is made even more difficult because the existing collaborative environments are based on differing and disjointed software frameworks.

SUMMARY

A system and method are configured to provide a virtual application desktop and application channel. The system includes a virtual machine executing on an operating system within which multiple applications can concurrently execute. A plurality of applications can each have a protected namespace and be configured to execute using the virtual machine. Each of the plurality of applications can have a request box. A centralized communication engine can be configured to control communications between each request box. In addition, the centralized communication engine can be configured to retrieve, transfer and distribute data between the request boxes of the applications in response to requests from the applications.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Figure 1:
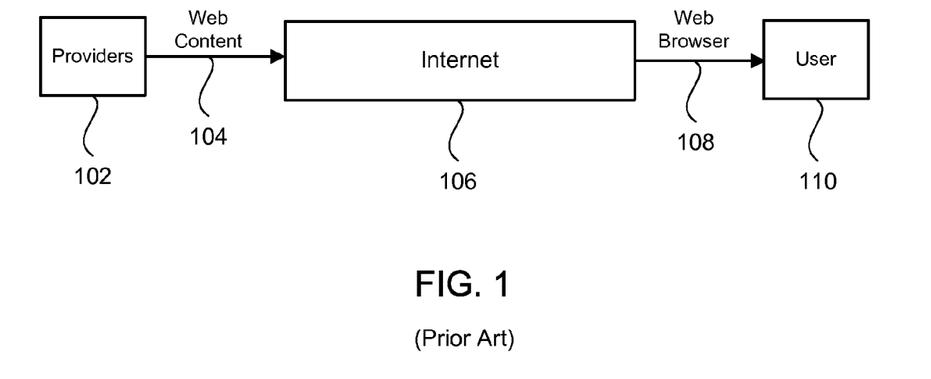
FIG. 1 is a block diagram illustrating the current structure of the Internet and the content oriented nature of the Internet.

The World Wide Web (the Web) has revolutionized the way information and services are distributed, marketed and accessed regardless of geographical location. As shown in FIG. 1 for the current Web, providers 102 use the Web or Internet 106 to broadcast information or content 104 and the users 110 employ a Web browser 108 to search and obtain the information. However, the Web has not been used as effectively as it might be for the distribution of software applications on demand.

The present system and method includes an application framework using a virtual machine that enables applications to be distributed effectively to users on-demand using the World Wide Web (the Web). This allows users to have a workspace that is a collection of accumulated, independently-designed applications. The applications executing in a virtual machine share non-trivial data structures while maintaining a high level of security between the applications. In addition, the applications can be easily and automatically updated using the Web without the fear of receiving malware.

One type of application that may be distributed using the framework is Java applications. However, other application types may be distributed using the present framework, such as JOGL, JDBC, J2EE, Active X, and similar applications and components.

This modular framework eliminates the need for user to install an application into an operating system and also reduces the costs involved with production, packaging, and shipping of the software product. This technology can apply a pay-per-use business model for software applications and the delivery mechanism may be disruptive to known packaging methods for software distribution.

The present invention advances cyber-infrastructure to a level where computer users can perform individual work and collaborate with others at a new level of efficiency and productivity to achieve shortest time to solution. Such needs were raised in the 2003 National Science Foundation Blue-Ribbon Advisory Panel report titled 'Revolutionizing Science and Engineering through Cyberinfrastructure' and the Report to the President titled 'Computational Science: Ensuring America's Competitiveness' by President's Information Technology Committee on June 2005. The need for better computational infrastructure and support was also addressed in the January 2006 presidential State of the Union address.

The framework provides effective and secure distribution of data-intensive software and applications required in a large number of industries and domains. While the web has revolutionized the way information is disseminated, with content, media distribution, and marketing becoming independent of geographical location, the web is still evolving and effective ways of providing services are still being developed. The present system and method leverages current Web infrastructure to build an advanced computing environment for data and computing-intensive work where data, tools, and resources are distributed from multiple sites.

In one embodiment, the software platform technology is called Java On-Demand Application Framework (JODAF). The technology enables the users to use application tools from the Web on demand. More importantly, customizable, platform-independent enterprise solutions can be constructed with this framework. This enables the user to fit the applications to specific work demands rather than to fit the work demands into a pre-configured enterprise system. The application framework allows diverse types of application tools, data, and resources distributed over the Internet to be accessed concurrently from a single virtual desktop environment in a simpler, secure, and more transparent manner. This functionality combined with distributed, remote server access capabilities offers benefits to all industries that require remote access to data and server-based applications. These applications can cover a wide range of end-user applications from commodity desktop software applications to enterprise solutions for large corporations.

For example, the framework may include a number of Molecular Modeling and Simulation tools that can be accessed using the cyber infrastructure for research, collaboration and education in Computational Science and Engineering schools. The Molecular Modeling and Simulation domain, which comprises a specific vertical market, encompasses nanotechnology, biotechnology, material science, chemical, petroleum, agri-chemical, and pharmaceutical industries. Combining the application framework with available remote-accessing tools opens opportunities for all industries that require remote access of data and server-based applications. These include Financial Services, Medical Informatics, Modeling and Simulation (M&S) and others.

Existing software companies as well as new startups can adopt the standards and methodology for the development of desktop application tools with user-friendly GUIs, visualization and data analysis tools applications and distribute them over the Web. This can provide companies with a competitive edge, since adopting the application framework reduces the costs of packaging, distribution, maintenance, installation and provides portability between operating systems.

Figure 2:
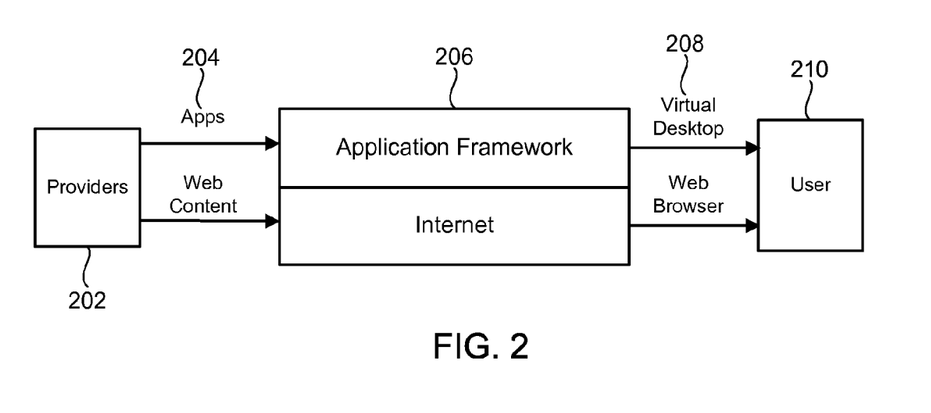
FIG. 2 is block diagram illustrating an embodiment of the application framework and virtual desktop environment that will operate in conjunction with the existing Internet.

FIG. 2 further illustrates that this technology enables the Web to move beyond its current functionality of distributing information content by allowing software applications to be distributed to the users on demand. Providers 202 can use the web to distribute content and applications 204. The applications are distributed over the Internet as requested by the application framework 206. This allows the end user 210 to view and execute the available applications through a virtual desktop 208. Consequently, it introduces a business model for "pay-per-use" software applications.

The application framework and system enables the users to use application tools on demand without having to install them on their desktop computers. These application tools do not have to reside at a central web-portal but can be located on different servers and are 'delivered' to the user's virtual desktop environment on demand in the same way as web-pages located at different web-servers are delivered to the user's Web-browser as shown in FIG. 2.

Figure 3:
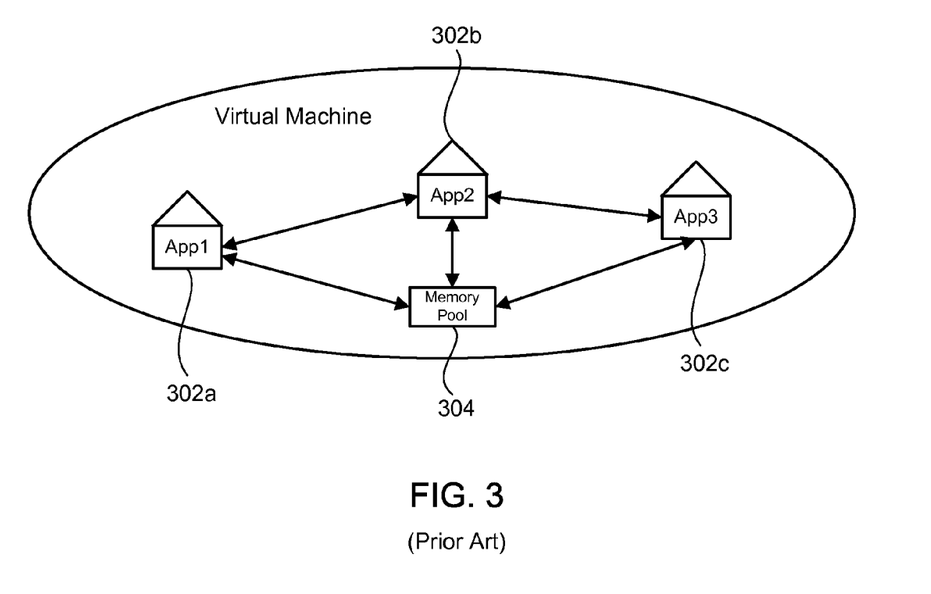
FIG. 3 is a block diagram illustrating a plurality of applications executing within a virtual machine that are tightly coupled and sharing the same memory pool.

FIG. 3 illustrates one of the problems with running multiple applications within the same virtual machine in past systems. When multiple applications 302a-c are executing within a single virtual machine they are tightly coupled even if there is little communication between the applications. This means that the applications will be using a shared memory pool 304 which provides the opportunity for applications to corrupt the memory space and even the execution instructions of other applications. Other unexpected interactions can also occur when multiple application run within the same virtual machine. For example, their name spaces or internal class names may conflict with each other. This is why interpreted or just-in-time compiled applications normally each run within their own virtual machine. However, when each application executes on a separate virtual machine then an application will have difficulty communicating with any other applications.

One feature of the present system is that once an application is loaded into the framework, it can communicate with other applications already running in the framework or registered in the framework via pre-defined interfaces. This feature enables the user to construct a customized enterprise solution to fit specific work demands rather than to fit the work demands into a pre-configured enterprise system. The software framework can be based on Java technologies, ActiveX, or other technologies that can execute in a virtual desktop environment and thus it is platform independent and can support any type of existing or future application. This is significantly different from technologies such as the Java WebStart technology which can also launch an independent Java application on the users' desktop without the need for user installation.

Figure 4:
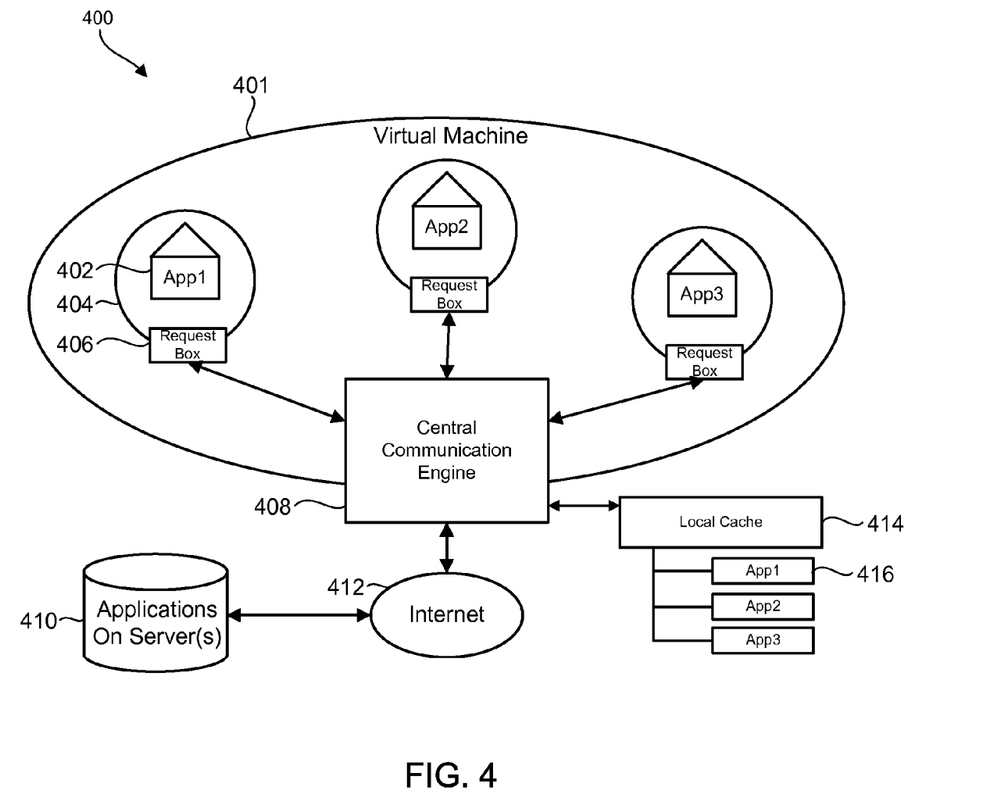
FIG. 4 illustrates an embodiment of an enhanced virtual machine configured to execute multiple applications that are securely separated from each other using a request box and a separate name space for each application.

FIG. 4 illustrates that communication security can also be enforced in the described embodiments of the system. In the application framework or architecture 400, an application 402 that is loaded into the virtual desktop environment behaves as an independent application and cannot communicate with other applications except by using the framework.

The application cannot communicate directly with other applications because the application will have a protected namespace 404 and securely defined communication channels. The securely defined communication channel illustrated in FIG. 4 is the central communication engine 408. The framework has a defined Open Interface (OI) which describes a specific interface format, procedural format, and data format so that other applications can communicate with each other. Information on OI is available to others. These OIs will be user configurable for an individual application. The central communication engine enforces these interfaces.

The central communication engine 408 can also have its own local cache 414 that contains a separate sub-cache for each of the applications within the virtual machine. In one embodiment, the central communication engine can download the applications from a server on the Internet and cache the application locally 416. Then the application can be dynamically instantiated in the virtual machine. As described previously, the applications can communicate using the central communication engine while each application is isolated in its own protective sandbox. In another embodiment, the central communication engine can store data, executable segments, and other information while it is being passed between the request boxes 406. For example, the cache may store the information that is being referenced via the request box.

Passing data between two independent applications creates a security risk that a malicious application can attempt to obtain sensitive information on the system. The present system and method provides interfaces between the applications in such a way that it is difficult or impossible for an application to pass any sensitive information such as user account information.

The framework can enforce several rules in the interface between applications:
1) All sensitive information must be kept within the application;
2) An application can limit its responses to requests from known or registered sources within the framework;
3) An application can generate randomly generated request IDs or encrypted IDs to keep track of all requests in an active session.
4) An application cannot initiate a new connection outside the range of defined applications specifically authorized by the user.

These rules allow secure interfaces between all applications because the framework assumes that all applications are malicious.

Through these interfaces, Application A can initiate and send data or requests to Application B without having to know about or modify Application B's source code. In addition, the application framework gives all applications their own separate directory and sub-directories on a local mass storage. This protected hard drive area can be called a sandbox. The applications have complete freedom to read, write and create files within that sandbox. The applications have no read or write access permissions outside of the sandbox (with the exception of read-only system directories).

Any external file operations that are needed outside the sandbox can be done by the Global File Explorer which is an application that is distributed with the application framework. The Global File Explorer shows the user everything the application does when it leaves its sandbox. This limits the ability of applications to take malicious or hidden actions. In addition, socket communications and other networking functions can be limited and supervised to prevent malicious web access.

For each application, the Open Interface may consist of the knowledge of the input and output data formats and nature, and a list of functions such as (initiate, send data, receive data, close, etc) that it can perform with the corresponding calls.

As an example of a model of the secure Open Interface, three example applications in the environment can be described, namely the Global File Explorer, Thermo for calculating thermodynamic properties of a given molecule, and Pandora, a general Java plotting tool. These applications may be stand alone Java applications. From the virtual desktop and using the framework's Open Interface, Thermo will be able to open appropriate work files using the Global File Explorer that can be located on the local disk or on a remote server, calculate thermodynamic properties, then initiate Pandora at runtime and send data for it to plot.

Figure 5:
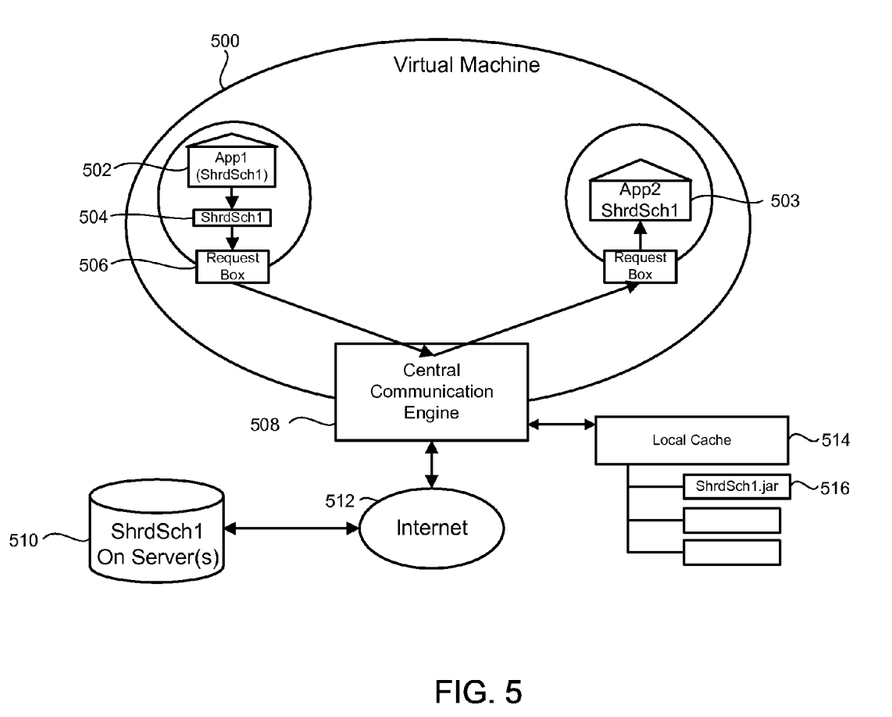
FIG. 5 illustrates an embodiment of an enhanced virtual machine configured to share data and data structures in an embodiment of the invention.

FIG. 5 illustrates an embodiment of the system where a Shared Schema (ShrdSch1) 504 is available on a server 510 that is accessible over the Internet 512 and such schemes are freely available for anyone to use. In the illustrated example, App1 502 and App2 503 are executing in the virtual machine 500 and both use ShrdSch1 and the two applications can communicate by referencing the ShrdSch1.jar in their request box even though both applications were created independently and without knowledge of the other application. The central communication engine stores the ShrdSch1.jar 516 in the local cache 514 where both applications can access the data and then notify the other of the changes using the request boxes 406.

The communication framework in the present embodiment may be compared to a post office box. One application can sent a request in one function. For example:

```
app1Requestbox.sendRequest( app2RequestBox, "ShowData", app1Data,
"NotifyDone");
```

Application 2 may receive the request in its request box and may even reply. For example:

```
Public Object recieveRequest (ReqBox sender, String request, Object data,
String reply)
{ if (request == "Show Data")
    Boolean bSuccessful = app2.showData(data);
    Return app2RequestBox.sendRequest(sender, reply, bSuccessful, null);
}}
```

The framework can assume failure and use try..catch statements. Application 2 is free to implement or ignore any request and Application 1 does not expect any success. This means that the applications are no longer tightly bound.

An example of how this might work using a spreadsheet application and a graphing application will now be described. The spreadsheet may have data to display in a graph. Accordingly, the spreadsheet program sends a URL or application name of a graphing application to the central communication engine. The spreadsheet program is asking the central communication engine to find the graphing application on the Web and make its request box available. The central communication will download or update the application and make the request box address available which is communicated back to the spreadsheet program.

The spreadsheet then asks the graph application to launch itself. Then the spreadsheet can ask the graph to display the data in the graph's request box and reply with "Updated Data" when it is complete. If the graph application can respond, then it does. The user may then modify data in the graph and the graph can send the modified data back to the spreadsheet's request box and the spreadsheet may update the data within itself if desired.

A significant benefit to the user is that application framework removes the need for installation, configuration and maintenance of out-of-the-box applications on their computers. FIG. 4 illustrates that applications using the application framework can be delivered from application servers 410 to the user on-demand via the Internet 412. This can provide a per-use pricing model to software applications. Furthermore, software companies will have a more cost-effective method for distributing and marketing Java applications over the Web. This framework can eliminate production costs, packaging costs, and shipping costs in software distribution. The user does not have to absorb the costs of production, packaging, and shipping thus allowing vendors to price the software more competitively.

This may lead to a more cost-effective solution for the user. For example, a user who needs to use an up-to-date application for preparing a tax return only once a year will then only pay for a one-time use and does not need to install the program.

The application framework can increase the number of applications available to the user and this is similar to the way the value of the Web increases with added content. The cost benefits to the software developers and the ease-of-use to the user will encourage software developers to adopt the platform.

In one embodiment, the virtual desktop environment allows users to research the availability of tools within a Web browser. Descriptor files may be published on the Web in a directory containing the information a central communication engine needs to download and execute applications dynamically. The end user may browse through these descriptors and select applications to use. For example, the descriptor file may contain the application name, an application function description, version number, application web address, address of the application's request box within the framework, the name of the request for launching the application, external library names, shared schema names, and any other information relating to the application needed by the framework. Because the descriptor file includes the application version number, the application framework can easily know whether the application needs to be updated or not before each use. Other technologies in support of the application framework and scientific modeling and simulation tools are expected to emerge.

In an additional embodiment using the descriptors, a third-party application provider can register its applications in a central application catalog system which contains a list of all the submitted applications supported by the system. A discovery process can automatically read the descriptors for the third-party applications from a web address supplied by the third-party application provider. This allows the system to determine the methods used by all the submitted applications in the catalog when interfacing with other applications, both as an input supplier or an output consumer (i.e. be able to use data generated by the other applications). This extensive catalog system enables users to have the choice of selecting many different tools and even competitive tools which offer similar functionalities.

Ensuring the security of the system and sensitive user information is important for the application framework. There are two types of security, namely the security of the framework and of the user sensitive information, such as login accounts and passwords.

The application framework runs on the user desktop and can be secured at that level. Security can be enforced by allowing the application file system access only into partitioned areas. Any attempt to access data outside of this partitioned or protected area will result in shutdown of the application.

With the Open Interfaces, third-party developers can easily port their products into the platform and pass data to other applications within the environment and vice versa. Constructing a workflow to connect independent applications or customizing an enterprise system in a secure way is possible.

Stability is a requirement in any robust application platform. Since the framework allows independent applications to be loaded into the framework on demand (at run time), it provides an optimal use of the system memory and bandwidth. The stability of the whole system becomes the stability of those applications currently loaded in the framework. It is important to isolate the stability of individual applications from that of the framework, (i.e. crashing of a certain application does not crash the whole environment). This is a property of the present software architecture since each application is treated as an independent thread and thus it will not affect the whole environment.

However, to provide an additional layer of stability control, an Application Manager can be provided that allows the user to terminate any currently running application in the environment. In the case of a hung application, the user will use the Application Manager to terminate the application and restart it again.

The hardware accessed by the virtual desktop on the server side may be a grid-computing system. For example, the virtual desktop and application can access a meta-cluster to enable the parallelization of informatics applications. Combining the application framework with applications for remote access of Unix-based servers provides a client environment framework that will support numerous Java applications allowing the user to access different servers for different tasks concurrently. Such a framework can be used for computational and data-intensive work that cannot be done on the user desktop computer but must be distributed to different remote servers.

For example, data-intensive simulation applications and tools can be executed, such as compute-intensive graphics rendering, molecular modeling and computationally-intensive simulation. These tools may include visualization/data analysis tools and graphic-user-interfaces for molecular modeling and simulation. The framework can be used with remote-access technologies such as large process simulation, banking, medical informatics, health sciences research, modeling and simulation, finance, fluid dynamics, weather research, molecular science and a host of other areas.

Figure 6:
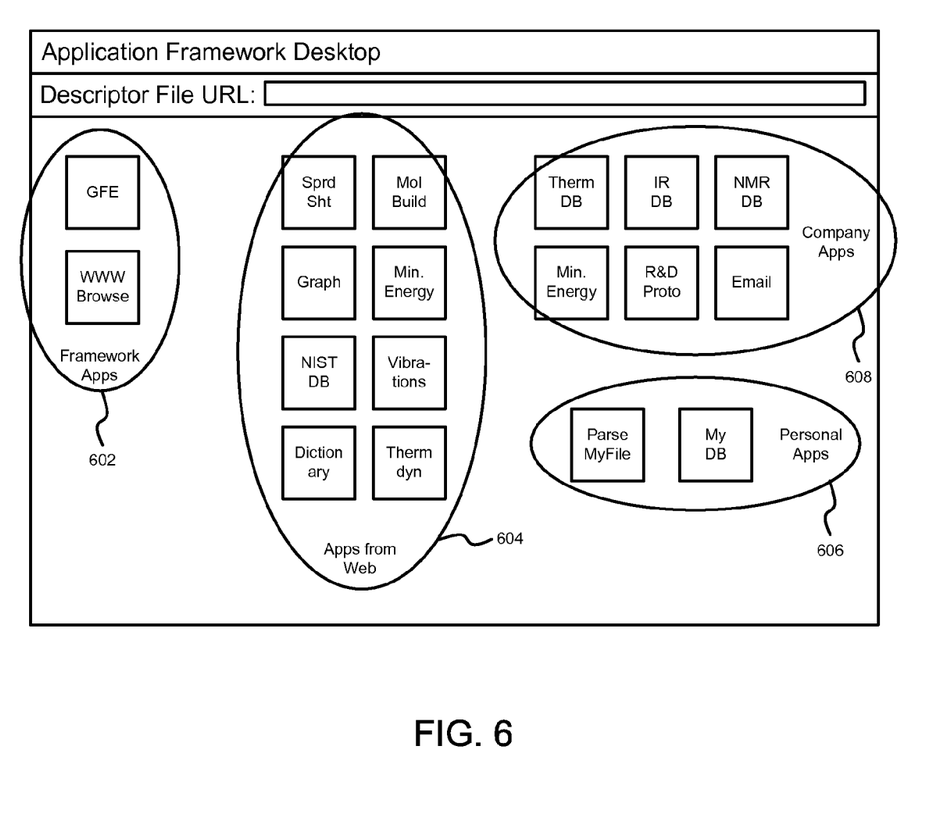
FIG. 6 is an embodiment of a graphical desktop for the application frame work of the present invention.

FIG. 6 illustrates an embodiment of a graphical-interface desktop for the application framework. The users can add or remove active applications from their virtual desktop environment at run time. Changing the active applications that are executing with the virtual desktop environment using a user interface that is connected directly to the virtual machine makes the system more flexible. This leads to a good use of the memory resources and reduces the bandwidth requirements to make the platform extendable and scalable. More importantly these applications can communicate to each other seamlessly via open interfaces making the environment a user on-demand customizable enterprise solution.

FIG. 6 further illustrates that there may be certain applications that are native to the framework 602, personal applications 606 and locally-loaded company applications 608. In addition, applications can be loaded from the web 604 by the user typing the URL of a descriptor file which will load the application into the desktop and the virtual machine. These applications are contained in a workspace for a user and the user can link them together to form a processing pipeline. In addition, it is possible to create composite applications that communicate using shared schemas. These composite applications can be assembled dynamically the user at run time.

Some of the salient features of the platform are highlighted below:
1. Allows for both individual and collaborative work environments in the same software framework facilitating a strong integration of individual and shared work.
2. Users can access diverse types of application tools, data, and computing resources distributed over the Internet on different servers concurrently from a single desktop environment removing the physical constraints of location-oriented computing.
3. The workspace facilitates distributed computing in a straight-forward, secure, and transparent manner.
4. The framework distributes the workload between the client and server computers in a way that minimizes communication, reduces bandwidth requirements, and makes the environment less sensitive to network instability.
5. Allows seamless communications between individual applications and between applications and databases improving the user's ability to effectively perform computing work.
6. Includes an extendable and flexible framework that allows users to pull applications and data from the Internet in a way that effectively customizes their individual virtual-workspace environment.

The combined application framework with the remote-access tools offers collaborative opportunities for all industries that require remote access of data and server-based applications. These tools may be used in many environments, such as:
1. Universities that have graduate programs in chemical-related fields such as chemistry, chemical engineering, or pharmaceutical chemistry.
2. National labs and computing centers that support applications in molecular modeling and simulation.
3. Nanotechnology, biotechnology, material science, chemical, petroleum, agri-chemical, and pharmaceutical industries that have a modeling and simulation component in their research and development efforts.

In the server market, many users are required to remotely access data and applications tools on the servers from their desktop computers. Particularly for Unix-based servers, the current SSH technology for remote access is cumbersome to use and requires the user to be familiar with the Unix operating system in a line-command environment. The present system is an extendable cross-platform open architecture software framework capable of accessing independent application tools, files, databases, computing cycles distributed over different servers from a virtual desktop environment running on the users local computer.

Figure 7:
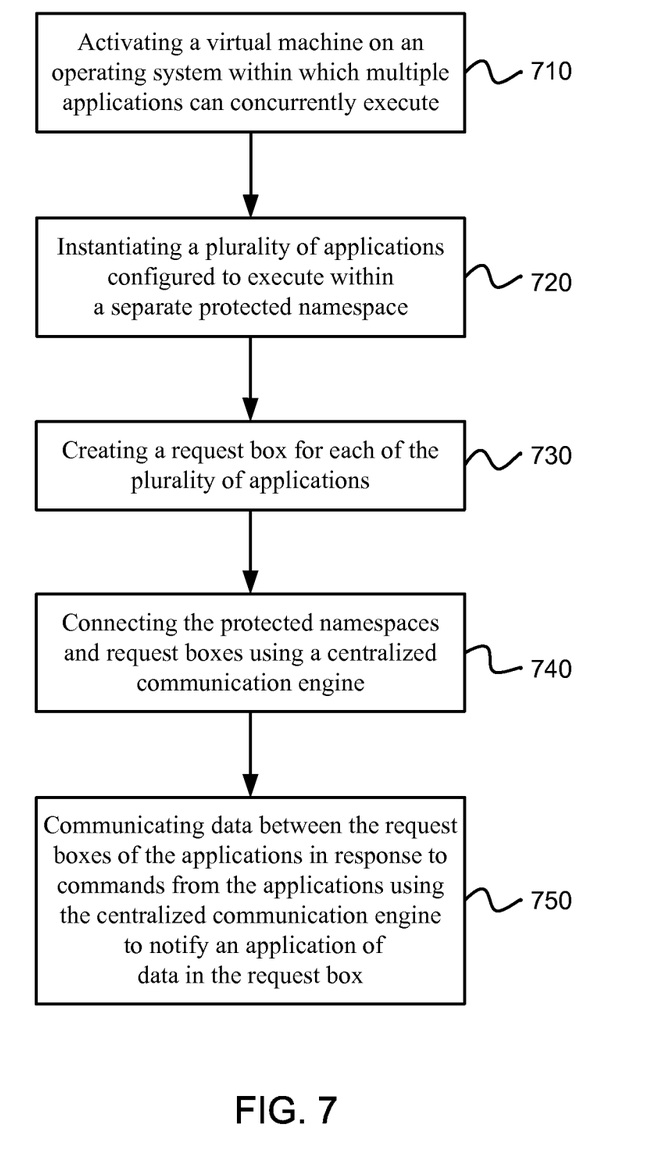
FIG. 7 is a flow chart illustrating an embodiment of a method of providing a virtual application desktop.

FIG. 7 is a flow chart illustrating an embodiment of a method of providing a virtual application desktop and communication channel. The method includes the operation of activating a virtual machine on an operating system within which multiple applications can concurrently execute, as in block 710. As described above, the virtual machine may be any software application that creates a virtualized environment between the computer platform and its operating system, so that the end-user application operates on an abstract machine. The virtual machine may be an interpreter, a just-in-time compiler, or another known type of virtual machine.

Another operation is instantiating a plurality of applications within the virtual machine, as in block 720. Each of the applications is configured to execute within a separate protected namespace which separates the application from the other applications within the virtual machine. A request box for each of the plurality of applications can also be created, as in block 730.

The protected namespaces and request boxes are connected to a centralized communication engine, as in block 740. This allows the application to communicate data between the request boxes of the applications in response to commands from the applications via the centralized communication engine, as in block 750. The notification of data in a request box can be performed by having the centralized communication engine notify an application of data in the request box.

The application framework may open a new and broad horizontal market on the Web as a media for distribution of software applications, and this distribution framework does not require user installation and software maintenance. In one embodiment, the software framework allows users to pull or download different Java software applications from the Internet located at different servers and customize their own virtual desktop environments on demand.

The application framework system and method described herein is to Java software applications what the Web currently is to content. It allows the Web to move to the next level of complexity and versatility by allowing the providers to provide not only information and services but also software applications on demand without the need of user installation. The value of the present system will increase exponentially with the number of applications added.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system to provide a virtual application desktop and communication framework, comprising:
    a virtual machine executing on an operating system using which multiple applications can concurrently execute;
    a plurality of applications each having a protected namespace with securely defined communication channels and configured to execute within the virtual machine;
    a request box for each of the plurality of applications, wherein the request box provides an interface between applications in the protected name space and a centralized communication engine; and
    the centralized communication engine configured to control communications between each request box, wherein the centralized communication engine includes a local cache memory to store the plurality of applications locally and store the information being referenced via the request box, the centralized communication engine being configured to retrieve, transfer and distribute data between the request boxes of the plurality of applications in response to requests from the plurality of applications.

2. The system as in claim 1, further comprising a defined Open Interface (OI) for the request boxes which describes a specific interface format, procedural format, and data format to enable applications to communicate using the request boxes.

3. The system as in claim 1, wherein the centralized communication engine enforces security protocols in the communications between the applications.

4. The system as in claim 1, wherein the applications communicate using the request boxes to send data between applications via the communication engine within the virtual machine.

5. The system as in claim 1, wherein an end user of the virtual application desktop for the virtual machine is enabled to assemble applications and application components together within the virtual application desktop to form customized and on-demand applications.

6. The system as in claim 1, wherein the applications can be downloaded from the Web.

7. The system as in claim 1, wherein the applications are coupled together in a process mode to form a larger processing pipeline.

8. A method of providing a virtual application desktop and communication framework, comprising:
    activating a virtual machine on an operating system within which multiple applications can concurrently execute;
    instantiating a plurality of applications configured to execute within a separate protected namespace with securely defined communication channels, respectively within the virtual machine;
    creating a request box for each of the plurality of applications, wherein the request box provides an interface between the application in the protected name space and a centralized communication engine;
    connecting the protected namespaces and request boxes using the centralized communication engine, wherein the centralized communication engine includes a local cache memory to store the plurality of applications locally and store the information being referenced via the request box; and
    communicating data between the request boxes of the applications in response to commands from the applications via the centralized communication engine, wherein the notification of data in a request box is performed by having the centralized communication engine notify an application of data in the request box.

9. The method as in claim 8, further comprising enabling the centralized communication engine to raise a request flag for the request box of one of the plurality of applications to which data is being sent.

10. The method as in claim 8, further comprising enforcing security protocols for communications between the plurality of applications using the centralized communication engine.

11. The method as in claim 8, further comprising communicating between the applications using the request boxes to send communications based on defined interface formats, procedural formats, processes, and data between applications via the central communication engine.

12. The method as in claim 8, further comprising assembling applications and application components together within the virtual application desktop to form customized and on-demand applications for an end user.

13. The method as in claim 8, further comprising downloading the applications from the Internet into the virtual application desktop.

14. The method as in claim 8, further comprising changing which applications are executing in the virtual desktop environment at run time by user command through the virtual desktop environment interface.

15. The method as in claim 8, wherein the applications are coupled together in a process mode to form a larger processing system.

16. The method as in claim 8, further comprising the step of limiting application responses to requests from only registered application sources within the framework.

17. The method as in claim 8, further comprising the step of enabling an application to randomly generate request IDs to keep track of all requests in an active session.

18. The method as in claim 8, further comprising the step requiring the storage of all sensitive information only within the application.

19. The method as in claim 8, wherein an application cannot access the space on a local hard disk outside a sandbox area specified by the framework.

* * * * *

UNITED STATES PATENT AND TRADEMARK OFFICE
CERTIFICATE OF CORRECTION

PATENT NO. : 8,719,816 B2  Page 1 of 1
APPLICATION NO. : 11/685683
DATED : May 6, 2014
INVENTOR(S) : Truong et al.

It is certified that error appears in the above-identified patent and that said Letters Patent is hereby corrected as shown below:

Title page, item [12], Inventor should be --Truong--.

Title page, item [75], Inventor, Thanh N. "Troung" should be --Truong--.

Signed and Sealed this
Twelfth Day of August, 2014

Michelle K. Lee
*Deputy Director of the United States Patent and Trademark Office*